United States Patent
McSporran et al.

(10) Patent No.: US 9,598,311 B2
(45) Date of Patent: Mar. 21, 2017

(54) HEAT TREATABLE COATED GLASS PANE

(75) Inventors: Neil McSporran, Liverpool (GB); Monica Joscelyn Hughes, St. Helens (GB); Gregory Clarke, Manchester (GB)

(73) Assignee: Pilkington Group Limited, Lathom (GB)

( * ) Notice: Subject to any disclaimer, the term of this patent is extended or adjusted under 35 U.S.C. 154(b) by 454 days.

(21) Appl. No.: 13/261,711

(22) PCT Filed: Feb. 16, 2012

(86) PCT No.: PCT/GB2012/050354
§ 371 (c)(1),
(2), (4) Date: Aug. 29, 2013

(87) PCT Pub. No.: WO2012/110823
PCT Pub. Date: Aug. 23, 2012

(65) Prior Publication Data
US 2013/0344321 A1 Dec. 26, 2013

(30) Foreign Application Priority Data
Feb. 17, 2011 (GB) .................... 1102724.0

(51) Int. Cl.
B32B 15/04 (2006.01)
B32B 17/06 (2006.01)
C03C 17/36 (2006.01)

(52) U.S. Cl.
CPC .......... *C03C 17/3618* (2013.01); *C03C 17/36* (2013.01); *C03C 17/366* (2013.01); *C03C 17/3626* (2013.01); *C03C 17/3644* (2013.01); *C03C 17/3681* (2013.01); *C03C 2217/73* (2013.01); *C03C 2218/156* (2013.01); *Y10T 428/265* (2015.01)

(58) Field of Classification Search
USPC ....... 428/426, 428, 432, 433, 434, 688, 689, 428/697, 699, 701, 702
See application file for complete search history.

(56) References Cited

U.S. PATENT DOCUMENTS

| 6,398,925 B1 | 6/2002 | Arbab et al. |
| 6,994,910 B2 | 2/2006 | Stachowiak |
| 7,563,347 B2 | 7/2009 | Kriltz et al. |
| 8,105,695 B2 | 1/2012 | DePauw et al. |
| 8,497,014 B2 | 7/2013 | Unquera et al. |
| 2004/0086723 A1* | 5/2004 | Thomsen ................ C03C 17/36 428/426 |
| 2005/0042459 A1* | 2/2005 | Kriltz ................ B32B 17/10174 428/432 |
| 2005/0042460 A1* | 2/2005 | Kriltz ................ B32B 17/10174 428/432 |
| 2005/0205416 A1 | 9/2005 | Stachowiak |
| 2009/0197077 A1 | 8/2009 | Reutler et al. |
| 2009/0263596 A1* | 10/2009 | Lao ........................ C03C 17/36 428/34 |
| 2010/0167034 A1 | 7/2010 | DePauw et al. |
| 2010/0279144 A1* | 11/2010 | Frank ...................... C03C 17/36 428/623 |
| 2011/0070417 A1 | 3/2011 | Reutler et al. |
| 2011/0268941 A1 | 11/2011 | Fischer et al. |
| 2011/0300319 A1 | 12/2011 | Reymond et al. |
| 2012/0177900 A1 | 7/2012 | Laurent et al. |

FOREIGN PATENT DOCUMENTS

| CN | 102079629 A | 6/2011 |
| DE | 199 22 162 A1 | 11/2000 |
| DE | 10 2008 007 981 A1 | 8/2009 |
| JP | 2010521410 A | 6/2010 |
| WO | WO 00/37381 A1 | 6/2000 |
| WO | WO 2004/063111 A1 | 7/2004 |
| WO | 2009/001143 A | 12/2008 |
| WO | 2009/122090 A | 10/2009 |
| WO | WO 2010/037968 A1 | 4/2010 |
| WO | 2010/072973 A | 7/2010 |
| WO | WO 2010/073042 A1 | 7/2010 |
| WO | 2011/020974 A | 2/2011 |

OTHER PUBLICATIONS

H. Chen et al; XP002679131; vol. 2011, Nr. 50; 2011-H90706; Jun. 1, 2011; WPI/Thomson.

* cited by examiner

*Primary Examiner* — Lauren R Colgan
(74) *Attorney, Agent, or Firm* — Marshall & Melhorn, LLC

(57) ABSTRACT

A coated glass pane comprising at least the following layers in sequence: a glass substrate; a lower anti-reflection layer, comprising in sequence from the glass substrate; a layer based on an oxide of Zn and Sn and/or an oxide of Sn, a separation layer based on a metal oxide and/or an (oxi)nitride of silicon and/or an (oxi)nitride of aluminum, and a top layer based on an oxide of Zn; and a silver-based functional layer.

15 Claims, No Drawings

HEAT TREATABLE COATED GLASS PANE

BACKGROUND OF THE INVENTION

The invention relates to heat treatable coated glass panes with a low-e and/or solar control coating. The invention also relates to methods of manufacturing said panes.

Heat treated glass panes which are toughened to impart safety properties and/or are bent are required for a large number of areas of application, for example for architectural or motor vehicle glazings. It is known that for thermally toughening and/or bending glass panes it is necessary to process the glass panes by a heat treatment at temperatures near or above the softening point of the glass used and then either to toughen them by rapid cooling or to bend them with the aid of bending means. The relevant temperature range for standard float glass of the soda lime silica type is typically about 580-690° C., the glass panes being kept in this temperature range for several minutes before initiating the actual toughening and/or bending process.

"Heat treatment", "heat treated" and "heat treatable" in the following description and in the claims refer to thermal bending and/or toughening processes such as mentioned before and to other thermal processes during which a coated glass pane reaches temperatures in the range of about 580-690° C. for a period of several minutes, e.g., for up to about 10 minutes. A coated glass pane is deemed to be heat treatable if it survives a heat treatment without significant damage, typical damages caused by heat treatments being high haze values, pinholes or spots.

US2009/0197077 describes glass successively coated with at least one dielectric layer based on aluminum and/or silicon nitride, at least one non-crystallised mixed oxide smoothing layer such as $ZnSnO_x$:Sb, a wetting layer e.g. ZnO, a silver based functional layer, a blocker layer for instance NiCr- or Ti-based, a layer of ZnO and a layer of aluminum and/or silicon nitride. The coated glass is said to exhibit reduced sheet resistance.

WO 2010/073042 describes chemically and mechanically robust heat treatable coated glass panes with low-e and/or solar control coatings comprising in sequence from the glass pane a lower anti-reflection layer of a base layer of an (oxi)nitride of silicon having a thickness of at least 8 nm, a middle layer of an oxide of Zn and Sn, and a top layer of a metal oxide; a silver-based functional layer; a barrier layer; and an upper anti-reflection layer comprising a layer of an (oxi)nitride of aluminum having a thickness of more than 10 nm.

DE 19922162 A1 describes a transparent layer system, especially a heat insulating and solar protection coating for glazing, which has a thin metal or metal compound modification layer between two base layers in the lower dielectric. Metals or substoichiometric oxides or nitrides are used for the modification layer, but oxides and nitrides have been found to not provide the desired improvement in optical properties.

It is well known to use substoichiometric $NiCrO_x$ as a sacrificial barrier layer (e.g. see US2009/0197077 and WO 2010/073042) since it affords favourable heat treatability. However, the presence of a $NiCrO_x$ layer complicates manufacturing because of the critical conditions required to deposit a layer of the correct stoichiometry. The use of $NiCrO_x$ furthermore leads to significant changes of optical properties, i.e. light transmittance, colour, absorption, light reflectance of the coating stack during a heat treatment that makes it difficult to achieve a single stock coated glass pane, i.e. a coated glass pane having essentially the same optical properties with and without a heat treatment. Therefore it would be attractive to provide a coated glass pane that can exhibit a neutral reflection colour (colourless) and low haze before and after toughening. It would also be desirable to provide a coated glass pane that exhibits less change in percentage light transmittance ($\Delta T_L$) and reflection colour ($\Delta a^*$, $\Delta b^*$) upon toughening. Accordingly, a coated glass pane that affords these optical benefits alongside good heat treatability, without the need for a substoichiometric $NiCrO_x$ sacrificial barrier layer above the silver-based functional layer, is sought after.

The inventors of the instant invention found that the parameter "haze" usually referred to when characterising the heat treatability of low-e and/or solar control coatings is often insufficient, as it does not fully reflect all types of defects that may arise during coating, heat treating, processing and/or handling of coated glass panes. They found that several low-e and/or solar control coated glass described as heat treatable did not withstand without visible damage one or the other test simulating ordinary environmental influences during storage, transport and use of the coated glass panes before and after a heat treatment and the mechanical and chemical conditions acting on the coated glass panes during usual handling and processing steps. Certain of the known heat treatable coated glass panes showed significant and clearly noticeable modifications of their optical properties and particularly of their reflection colour during a heat treatment.

A "single stock coated glass pane" as referred to in the present application is defined as a pane that upon heat treatment exhibits a $\Delta T_L \leq 2\%$, preferably $\Delta T_L \leq 1.5\%$ (where $\Delta T_L$ is the change in % light transmittance upon heat treatment), with a Rf $\Delta E^* \leq 3$, preferably Rf $\Delta E^* \leq 2$ (where the change in film side reflection colour upon heat treatment, Rf $\Delta E^* = SQR[L^*_1 - L^*_2)^2 + (a^*_1 - a^*_2)^2 + (b^*_1 - b^*_2)^2]$, $L^*_i$, $a^*_i$ and $b^*_i$ being the film side reflection colour values before and after heat treatment). The colour change, $\Delta E^*$, is defined by 1976 CIE ($L^*a^*b^*$) with illuminant D65 and 10° observer.

SUMMARY OF THE INVENTION

Accordingly, the invention aims to provide single stock coated glass panes. Particularly the reflection colour modification caused by a heat treatment should be so small that heat treated and non-heat treated coated glass panes may be glazed adjacent to each other without a reflection colour difference that is significantly larger than unavoidable production tolerances for coated glass panes.

DETAILED DESCRIPTION OF THE INVENTION

According to a first aspect of the present invention there is provided a coated glass pane comprising at least the following layers in sequence:
  a glass substrate;
  a lower anti-reflection layer, comprising in sequence from the glass substrate
    a layer based on an oxide of Zn and Sn and/or an oxide of Sn,
    a separation layer based on a metal oxide and/or an (oxi)nitride of silicon and/or an (oxi)nitride of aluminum, and
    a top layer based on an oxide of Zn; and
  a silver-based functional layer.

The coated glass pane of the present invention provides good heat treatability, without the need for a sacrificial barrier layer comprising $NiCrO_x$ above the silver-based functional layer. The coated glass pane may exhibit a neutral reflection colour (colourless) and particularly low haze before and after toughening. The pane also exhibits less change in light transmittance ($\Delta T_L$) and reflection colour ($\Delta a^*$, $\Delta b^*$) upon toughening than prior art panes. Less change in reflection colour upon toughening is advantageous for process reasons, quality control etc. The beauty of a single stock coated glass pane is that it avoids the need to stock two products, for instance, there is no need to stock a separate toughened version that matches the optical properties of an annealed version once it has been toughened. Therefore glazings that are to be toughened can be stored together with glazings that are not to be toughened without having to separate them.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

In the context of the present invention, where a layer is said to be "based on" a particular material or materials, this means that the layer predominantly consists of the corresponding said material or materials, which means typically that it comprises at least about 50 at. % of said material or materials.

The coated pane may further comprise a base layer based on an (oxi)nitride of silicon and/or an (oxi)nitride of aluminum located between the glass substrate and the layer based on an oxide of Zn and Sn and/or an oxide of Sn.

The coated pane may further comprise a barrier layer located, in sequence from the glass substrate, over the silver-based functional layer.

The coated pane may further comprise an upper anti-reflection layer located, in sequence from the glass substrate, over the silver-based functional layer and over any barrier layer.

Preferably the coated glass pane comprises at least the following layers in sequence:
a glass substrate;
a lower anti-reflection layer, comprising in sequence from the glass substrate
  a base layer based on an (oxi)nitride of silicon and/or an (oxi)nitride of aluminum,
  a layer based on an oxide of Zn and Sn and/or an oxide of Sn,
  a separation layer based on a metal oxide and/or an (oxi)nitride of silicon and/or an (oxi)nitride of aluminum, and
  a top layer based on an oxide of Zn;
a silver-based functional layer;
a barrier layer; and
an upper anti-reflection layer.

The base layer based on an (oxi)nitride of silicon and/or an (oxi)nitride of aluminum may have a thickness of at least 5 nm, preferably from 5 to 60 nm, more preferably from 10 to 50 nm, even more preferably from 20 to 40 nm, most preferably from 25 to 35 nm. This base layer serves as a glass side diffusion barrier amongst other uses.

The term "(oxi)nitride of silicon" encompasses both Si nitride ($SiN_x$) and Si oxinitride ($SiO_xN_y$) whilst the term "(oxi)nitride of aluminum" encompasses both Al nitride ($AlN_x$) and Al oxinitride ($AlO_xN_y$). Si nitride, Si oxinitride, Al nitride and Al oxinitride layers are preferably essentially stoichiometric (e.g. Si nitride=$Si_3N_4$, x=1.33) but may also be substoichiometric or even super-stoichiometric, as long as the heat treatability of the coating is not negatively affected thereby. One preferred composition of the base layer based on an (oxi)nitride of silicon and/or an (oxi)nitride of aluminum is an essentially stoichiometric mixed nitride $Si_{90}Al_{10}N_x$.

Layers of an (oxi)nitride of silicon and/or an (oxi)nitride of aluminum may be reactively sputtered from Si- and/or Al-based targets respectively in a sputtering atmosphere containing nitrogen and argon. An oxygen content of the base layer based on an (oxi)nitride of silicon and/or an (oxi)nitride of aluminum may result from residual oxygen in the sputtering atmosphere or from a controlled content of added oxygen in said atmosphere. It is generally preferred if the oxygen content of the silicon (oxi)nitride and/or aluminum (oxi)nitride is significantly lower than its nitrogen content, i.e. if the atomic ratio O/N in the layer is kept significantly below 1. It is most preferred to use Si nitride and/or aluminum nitride with negligible oxygen content for the base layer of the lower anti-reflection layer. This feature may be controlled by making sure that the refractive index of the layer does not differ significantly from the refractive index of an oxygen-free Si nitride and/or aluminum nitride layer.

It is within the scope of the invention to use mixed Si and/or Al targets or to otherwise add metals or semiconductors to the Si and/or Al component of this layer as long as the essential barrier and protection property of the base layer of the lower anti-reflection layer is not lost. It is well known and established to mix Al with Si targets, other mixed targets not being excluded. Additional components may be typically present in amounts of up to about 10-15 wt. %. Al is usually present in mixed Si targets in an amount of about 10 wt. %.

The layer based on an oxide of Zn and Sn and/or an oxide of Sn of the lower anti-reflection layer serves to improve stability during a heat treatment by providing a dense and thermally stable layer and contributing to reduce the haze after a heat treatment. The layer based on an oxide of Zn and Sn and/or an oxide of Sn of the lower anti-reflection layer may have a thickness of at least 0.5 nm, preferably from 0.5 to 10 nm, more preferably from 0.5 to 9 nm, even more preferably from 1 to 8 nm, even more preferably from 1 to 7 nm, even more preferably from 2 to 6 nm, even more preferably from 3 to 6 nm, most preferably from 3 to 5 nm. An upper thickness limit of about 8 nm is preferred due to optical interference conditions and by a reduction of heat treatability due to the resulting reduction in the thickness of the base layer that would be needed to maintain the optical interference boundary conditions for anti-reflecting the functional layer.

The layer based on an oxide of Zn and Sn and/or an oxide of Sn of the lower anti-reflection layer is preferably located directly on the base layer based on an (oxi)nitride of silicon and/or an (oxi)nitride of aluminum.

The layer based on an oxide of Zn and Sn (abbreviation: $ZnSnO_x$) of the lower anti-reflection layer preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. In other preferred embodiments the layer based on an oxide of Zn and Sn of the lower anti-reflection layer may comprise at most 18 wt. % Sn, more preferably at most 15 wt. % Sn, even more preferably at most 10 wt. % Sn. The layer based on an oxide of Zn and Sn may be deposited by reactive sputtering of a mixed ZnSn target in the presence of $O_2$.

The separation layer based on a metal oxide and/or an (oxi)nitride of silicon and/or an (oxi)nitride of aluminum may have a thickness of at least 0.5 nm, preferably from 0.5 to 6 nm, more preferably from 0.5 to 5 nm, even more preferably from 0.5 to 4 nm, most preferably from 0.5 to 3 nm. These preferred thicknesses enable further improvement in haze upon heat treatment. The separation layer provides protection during the deposition process and during a subsequent heat treatment. The metal oxide separation layer is either essentially fully oxidised immediately after its deposition, or it oxidizes to an essentially fully oxidized layer during deposition of a subsequent oxide layer.

The separation layer may be deposited using non-reactive sputtering from a ceramic target based on for instance a slightly substoichiometric titanium oxide, for example a $TiO_{1.98}$ target, as an essentially stoichiometric or as a slightly substoichiometric oxide, by reactive sputtering of a target based on Ti in the presence of $O_2$, or by depositing a thin layer based on Ti which is then oxidised. In the context of the present invention, an "essentially stoichiometric oxide" means an oxide that is at least 95% but at most 105% stoichiometric, whilst a "slightly substoichiometric oxide" means an oxide that is at least 95% but less than 100% stoichiometric.

When the separation layer is based on a metal oxide said separation layer may comprise a layer based on an oxide of Ti, NiCr, InSn, Zr, Al and/or Si.

In addition to the metal oxide and/or (oxi)nitride of silicon and/or (oxi)nitride of aluminum on which it is based, the separation layer may further include one or more other chemical elements chosen from at least one of the following elements Ti, V, Mn, Co, Cu, Zn, Zr, Hf, Al, Nb, Ni, Cr, Mo, Ta, Si or from an alloy based on at least one of these materials, used for instance as dopants or alloyants.

The top layer based on an oxide of Zn primarily functions as a growth promoting layer for a subsequently deposited silver-based functional layer. The top layer based on an oxide of Zn is optionally mixed with metals such as Al or Sn in an amount of up to about 10 wt. % (wt. % referring to the target metal content). A typical content of said metals such as Al or Sn is about 2 wt. %, Al being actually preferred. ZnO and mixed Zn oxides have proven very effective as a growth promoting layer that assists in achieving a low sheet resistance at a given thickness of the subsequently deposited silver-based functional layer. It is preferred if the top layer of the lower anti-reflection layer is reactively sputtered from a Zn target in the presence of $O_2$ or if it is deposited by sputtering a ceramic target, e.g. based on ZnO:Al, in an atmosphere containing no or only a low amount, generally no more than about 5 vol. %, of oxygen. The top layer based on an oxide of Zn may have a thickness of at least 2 nm, preferably from 2 to 15 nm, more preferably from 3 to 12 nm, even more preferably from 4 to 10 nm, even more preferably from 5 to 8 nm.

The silver-based functional layer(s) may consist essentially of silver without any additive, as is normally the case in the area of low-e and/or solar control coatings. It is, however, within the scope of the invention to modify the properties of the silver-based functional layer(s) by adding doping agents, alloy additives or the like or even adding very thin metal or metal compound layers, as long as the properties of the silver-based functional layer(s) necessary for its (their) function as highly light-transmitting and low light-absorbent IR-reflective layer(s) are not substantially impaired thereby.

The thickness of a silver-based functional layer is dominated by its technical purpose. For typical low-e and/or solar control purposes the preferred layer thickness for a single silver-based layer is from 5 to 20 nm, more preferably from 5 to 15 nm, even more preferably from 5 to 13 nm, even more preferably from 8 to 12 nm, most preferably from 10 to 11 nm. With such a layer thickness light transmittance values of above 86% and a normal emissivity below 0.05 after a heat treatment can be easily achieved for single silver coatings. If better solar control properties are aimed at the thickness of the silver-based functional layer may be adequately increased or several spaced functional layers may be provided as further explained below.

Preferably the top layer based on an oxide of Zn in the lower anti-reflection layer is in direct contact with the silver-based functional layer. Preferably the layers between the glass substrate and the silver-based functional layer consist of the four layers of the lower anti-reflection layer listed above.

While the invention is primarily directed to low-e and/or solar control coatings with only one silver-based functional layer it is within the scope of the invention to apply the inventive concept to low-e and/or solar control coatings comprising two or even more silver-based functional layers. By providing more than one silver-based functional layer, all functional layers are spaced by intervening dielectric layers (="central anti-reflection layers") to form a Fabry-Perot interference filter, whereby the optical properties of the low-e and/or solar control coating may be further optimized for the respective application, as is well known in the art. Preferably each silver-based functional layer is spaced apart from an adjacent silver-based functional layer by an intervening central anti-reflection layer. The intervening central anti-reflection layer(s) may comprise a combination of one or more of the following layers: a base layer based on an (oxi)nitride of silicon and/or an (oxi)nitride of aluminum, a layer based on an oxide of Zn and Sn and/or an oxide of Sn, a separation layer based on a metal oxide and/or an (oxi)nitride of silicon and/or and (oxi)nitride of aluminum, and a top layer based on an oxide of Zn.

In some preferred embodiments each silver-based functional layer is spaced apart from an adjacent silver-based functional layer by an intervening central anti-reflection layer, wherein each central anti-reflection layer comprises at least, in sequence from the silver-based functional layer that is located nearest to the glass substrate out of the silver-based functional layers that the central anti-reflection layer is located between, a base layer based on an (oxi)nitride of silicon and/or an (oxi)nitride of aluminum, a layer based on an oxide of Zn and Sn and/or an oxide of Sn, and a top layer based on an oxide of Zn.

In some cases each central anti-reflection layer located between two silver-based functional layers comprises at least—in sequence from the lower functional layer—a base layer based on an (oxi)nitride of silicon and/or an (oxi) nitride of aluminum, a layer based on an oxide of Zn and Sn and/or an oxide of Sn, a separation layer based on a metal oxide and/or an (oxi)nitride of silicon and/or an (oxi)nitride of aluminum, and a top layer based on an oxide of Zn.

The barrier layer that is preferably located over a silver-based functional layer may comprise one or more layers based on a metal oxide, such as ZnO:Al. The barrier layer may have a total thickness of from 0.5 to 20 nm, preferably from 1 to 10 nm, more preferably from 1 to 8 nm, even more preferably from 1 to 7 nm, most preferably from 2 to 6 nm. Such barrier layer thicknesses enable ease of deposition. It has been found that a superior protection of the silver-based functional layer during the deposition process and a high optical stability during a heat treatment can be achieved if the barrier layer comprises a layer of a mixed metal oxide sputtered from a mixed metal oxide target.

As the glazing is intended to undergo only a minimum colour (and light transmittance) modification during a heat treatment, a barrier layer comprising essentially stoichiometric metal oxides is preferred. The use of a barrier layer based on a metal oxide rather than a metallic or largely suboxidic barrier layer leads to an extremely high optical stability of the coating during a heat treatment and effectively assists in keeping optical modifications during a heat treatment small.

At least a portion of the barrier layer that is in direct contact with the silver-based functional layer is preferably deposited using non-reactive sputtering of an oxidic target to avoid silver damage.

The upper anti-reflection layer of a preferred embodiment of the invention may have a total thickness of from 20 to 50 nm, preferably from 25 to 50 nm, more preferably from 30 to 50 nm, even more preferably from 35 to 45 nm.

The upper anti-reflection layer may include a layer based on a metal oxide, such as an oxide of Zn and Sn and/or an oxide of Sn. Said layer based on a metal oxide of the upper anti-reflection layer may be in direct contact with the barrier layer.

The layer based on a metal oxide of the upper anti-reflection layer may have a thickness of at least 0.5 nm, preferably from 0.5 to 35 nm, more preferably from 0.5 to 25 nm, even more preferably from 2 to 20 nm, even more preferably from 5 to 18 nm, most preferably from 5 to 16 nm. When said layer based on a metal oxide is an oxide of Zn and Sn it preferably comprises about 10-90 wt. % Zn and 90-10 wt. % Sn, more preferably about 40-60 wt. % Zn and about 40-60 wt. % Sn, preferably about 50 wt. % each of Zn and Sn, in wt. % of its total metal content. In other preferred embodiments said layer based on an oxide of Zn and Sn of the upper anti-reflection layer may comprise at most 18 wt. % Sn, more preferably at most 15 wt. % Sn, even more preferably at most 10 wt. % Sn. Said layer may be deposited by reactive sputtering of a mixed ZnSn target in the presence of $O_2$ and contributes to the anti-reflection properties of the upper anti-reflection layer.

The upper anti-reflection layer may include a layer based on an (oxi)nitride of aluminum, and/or an (oxi)nitride of silicon, and/or an oxide of Al, Si, Ti, and/or Zr. Said layer may have a thickness of at least 5 nm, preferably from 5 to 50 nm, more preferably from 10 to 40 nm, even more preferably from 15 to 35 nm, most preferably from 15 to 30 nm.

The layer based on an (oxi)nitride of aluminum, and/or an (oxi)nitride of silicon, and/or an oxide of Al, Si, Ti, and/or Zr, which can in some cases make up a major part of the upper anti-reflection layer, provides stability (better protection during heat treatments) and diffusion barrier properties. Said layer is preferably deposited as an Al nitride and/or Si nitride layer by reactive sputtering of a Si, Al or mixed SiAl target, e.g. of a $Si_{90}Al_{10}$ target in a $N_2$ containing atmosphere. The composition of the layer based on an (oxi)nitride of aluminum and/or an (oxi)nitride of silicon may be essentially stoichiometric $Si_{90}Al_{10}N_x$.

Preferably the upper anti-reflection layer comprises
a layer based on a metal oxide, and
a layer based on an (oxi)nitride of aluminum and/or an (oxi)nitride of silicon.

The layer based on an (oxi)nitride of aluminum and/or an (oxi)nitride of silicon of the upper anti-reflection layer may be in direct contact with the layer based on a metal oxide in the upper anti-reflection layer as defined herein without any intervening further dielectric layer.

Preferably the upper anti-reflection layer comprises, in sequence from the barrier layer, a layer based on an (oxi)nitride of aluminum and/or an (oxi)nitride of silicon, and a layer based on a metal oxide. Preferably the upper anti-reflection layer consists of these two layers in sequence from the barrier layer as set out in the previous sentence.

In an alternative embodiment the upper anti-reflection layer comprises, in sequence from the barrier layer,
a layer based on a metal oxide, and
a layer based on an (oxi)nitride of aluminum and/or an (oxi)nitride of silicon.

Preferably the upper anti-reflection layer comprises a layer based on an oxide of Zn and Sn and/or of an oxide of Sn, and
a layer based on an (oxi)nitride of aluminum and/or an (oxi)nitride of silicon.

A protective layer may be deposited as top layer (outermost layer) of the upper anti-reflection layer for increased mechanical and/or chemical robustness, e.g. scratch resistance. Said protective layer may comprise a layer based on an oxide of Al, Si, Ti, and/or Zr.

To minimize any light absorption in the coating and to reduce the light transmittance increase during a heat treatment all individual layers of the upper and lower anti-reflection layers are preferably deposited with an essentially stoichiometric composition.

To further optimize the optical properties of the coated pane the upper and/or lower anti-reflection layers may comprise further partial layers consisting of suitable materials generally known for dielectric layers of low-e and/or solar control coatings, in particular chosen from one or more of the oxides of Sn, Ti, Zn, Nb, Ce, Hf, Ta, Zr, Al and/or Si and/or of (oxi)nitrides of Si and/or Al or combinations thereof. When adding such further partial layers it should however be verified that the heat treatability aimed at herein is not impaired thereby.

It will be appreciated that any further partial layer may contain additives that modify its properties and/or facilitate its manufacture, e.g. doping agents or reaction products of reactive sputtering gases. In the case of oxide based layers nitrogen may be added to the sputtering atmosphere leading to the formation of oxinitrides rather than oxides, in the case of nitride based layers oxygen may be added to the sputtering atmosphere, also leading to the formation of oxinitrides rather than nitrides.

Care must be taken by performing a proper material, structure and thickness selection when adding any such further partial layer to the basic layer sequence of the inventive pane that the properties primarily aimed at, e.g. a high thermal stability, are not significantly impaired thereby.

According to another aspect of the present invention there is provided a method of manufacturing a coated glass pane in accordance with the present invention comprising providing a glass substrate and successively applying to said glass substrate a base layer based on an (oxi)nitride of silicon and/or an (oxi)nitride of aluminum, a layer based on an oxide of Zn and Sn and/or an oxide of Sn, a separation layer either based on a metal oxide by sputtering from a metal oxide target or depositing a metal layer that is subsequently oxidised, and/or based on an (oxi)nitride of silicon and/or an (oxi)nitride of aluminum by reactively sputtering from a Si- and/or Al-based target in a sputtering atmosphere containing at least nitrogen, a top layer based on an oxide of Zn, a silver-based functional layer, a barrier layer, and an upper anti-reflection layer, wherein any portion of the barrier layer that is in direct contact with the silver-based functional layer is deposited by sputtering in an atmosphere with no or up to 5% vol. oxygen.

The invention is not limited to a specific production process for the coating. However, it is particularly preferred if at least one of the layers and most preferably all layers are applied by magnetron cathode sputtering, either in the DC mode, in the pulsed mode, in the medium frequency mode or in any other suitable mode, whereby metallic or semi-conducting targets are sputtered reactively or non-reactively in a suitable sputtering atmosphere. Depending on the materials to be sputtered planar or rotating tubular targets may be used.

The coating process is preferably carried out by setting up suitable coating conditions such that any oxygen (or nitrogen) deficit of any oxide (or nitride) layer of the anti-reflection layers of the coating is kept low to achieve a high stability of the light transmittance and colour of the coated glass panes during a heat treatment.

The process parameters for the manufacture of inventive heat treatable coated glazings and the thicknesses and materials of the individual layers are preferably chosen such that in the case of single silver-based functional layers—at least in those embodiments featuring a particularly high optical stability—during a subsequent heat treatment the sheet resistance of the coating decreases and the light transmittance of the coated glass pane does not change by more than about 2%, preferably no more than 1.5% ($\Delta T_L$).

Coated glass panes with a low-e and/or solar control coating according to the invention—if properly designed and comprising a single silver-based functional layer—may achieve a light transmittance $T_L$ of at least about 86% before a heat treatment. The light transmittance after a heat treatment will mostly be somewhat higher than the light transmittance before such heat treatment but will nevertheless meet the aim of a $\Delta T_L \leq 2\%$, preferably $\Delta T_L \leq 1.5\%$.

Light transmittance values referred to in the specification and in the claims are generally specified with reference to a coated glass pane comprising a 4 mm thick standard float glass pane having a light transmittance $T_L$ of 89% without a coating.

While a neutral reflection and transmission colour of the coated glass panes is usually aimed at, the colour of the coated glass panes according to the invention may be varied widely by adapting the thicknesses of the individual layers appropriately according to the intended visual appearance of the product.

Coated glass panes according to the invention may be used as such if no heat treatment is required. One major advantage of coated glass panes according to the invention consists in the fact that due to their thermal stability non-heat treated and heat treated coated glass panes may be used in the same building and glazed adjacent to each other without a major colour difference in reflection.

The thermal stability of coated glass panes according to the invention is reflected by the fact that the heat treated coated glass panes do not exhibit unacceptable levels of haze. Large increases in the haze value if detected during a heat treatment would indicate that the coating is beginning to be damaged.

According to another aspect of the present invention there is provided a multiple glazing incorporating a coated glass pane in accordance with the present invention. For example the multiple glazing may be laminated glass or insulated glass.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

Embodiments of the present invention will now be described herein, by way of example only:

For all Examples the coatings were deposited on 4 mm thick standard float glass panes with a light transmittance of about 89% using AC and/or DC magnetron sputtering devices, medium-frequency sputtering being applied where appropriate.

All dielectric layers of an oxide of Zn and Sn ($ZnSnO_x$, weight ratio $Zn:Sn \approx 50:50$) were reactively sputtered from zinc-tin targets in an $Ar/O_2$ sputter atmosphere.

The $TiO_x$ layers were deposited from slightly substoichiometric, conductive $TiO_x$ targets (x is about 1.98) in a pure Ar sputter atmosphere without added oxygen.

The ZnO:Al growth promoting top layers of the lower anti-reflection layers were sputtered from Al-doped Zn targets (Al content about 2 wt. %) in an $Ar/O_2$ sputter atmosphere.

The functional layers that in all Examples consisted of essentially pure silver (Ag) were sputtered from silver targets in an Ar sputter atmosphere without any added oxygen and at a partial pressure of residual oxygen below $10^{-5}$ mbar.

The barrier layers of Al-doped zinc oxide (ZnO:Al) were sputtered from conductive $ZnO_x$:Al targets in a pure Ar sputter atmosphere without added oxygen.

The suboxidic $NiCrO_x$ barrier layers were sputtered from $Ni_{80}Cr_{20}$ targets in an $Ar/O_2$ sputter atmosphere.

The layers of mixed silicon aluminum nitride ($Si_{90}Al_{10}N_x$) were reactively sputtered from mixed $Si_{90}Al_{10}$ targets in an $Ar/N_2$ sputter atmosphere containing only residual oxygen.

The layers of AlN were reactively sputtered from an Al target in an $Ar/N_2$ sputter atmosphere containing only residual oxygen.

TABLE 1

Haze score, haze verdict (pass/fail), $\Delta T_L$ (the change in % light transmittance upon heat treatment), and Rf $\Delta E^*$ (the change in film side reflection colour upon heat treatment) for a number of comparative coated glass panes and coated glass panes according to the present invention.

Layer (thickness/nm)

| | Example 1 Comparative | Example 2 Comparative | Example 3 Comparative | Example 4 Comparative | Example 5 | Example 6 |
|---|---|---|---|---|---|---|
| | $Si_{90}Al_{10}N_x$ (28) | $Si_{90}Al_{10}N_x$ (28) | $Si_{90}Al_{10}N_x$ (33) | $Si_{90}Al_{10}N_x$ (33) | $Si_{90}Al_{10}N_x$ (25) | $Si_{90}Al_{10}N_x$ (25) |
| | $ZnSnO_x$ (5) | $ZnSnO_x$ (5) | $ZnSnO_x$ (5) | $TiO_x$ (2.5) $ZnSnO_x$ (5) | $ZnSnO_x$ (5) $TiO_x$ (2.5) | $ZnSnO_x$ (5) $TiO_x$ (2.5) |
| | ZnO:Al (5) | ZnO:Al (5) | ZnO:Al (5) | ZnO:Al (5) | ZnO:Al (5) | ZnO:Al (5) |
| | Ag (10) | Ag (10) | Ag (10) | Ag (10) | Ag (10) | Ag (10.5) |
| | $NiCrO_x$ (1) | | $TiO_x$ (2) | | | $TiO_x$ (2) |
| | ZnO:Al (3) | ZnO:Al (3) | ZnO:Al (4) | ZnO:Al (4) $TiO_x$ (2) | ZnO:Al (4) | ZnO:Al (6) |
| | $ZnSnO_x$ (10) | $ZnSnO_x$ (10) | $ZnSnO_x$ (16) | $ZnSnO_x$ (16) | $ZnSnO_x$ (20) | $ZnSnO_x$ (10) |
| | $Si_{90}Al_{10}N_x$ (35) | $Si_{90}Al_{10}N_x$ (35) | $Si_{90}Al_{10}N_x$ (20) | $Si_{90}Al_{10}N_x$ (20) | $Si_{90}Al_{10}N_x$ (20) | $Si_{90}Al_{10}N_x$ (33) |
| Haze score | 0-1 | 4 | 5 | 5 | 0 | 0 |
| Pass/Fail | Pass | Fail | Fail | Fail | Pass | Pass |
| $\Delta T_L$ | 4.7 | 1.6 | 1.4 | 2.6 | 1.4 | 1.5 |
| Rf $\Delta E^*$ | 1.90 | 1.29 | 0.56 | 1.14 | 0.90 | 1.40 |

| | Example 7 | Example 8 | Example 9 |
|---|---|---|---|
| | $Si_{90}Al_{10}N_x$ (33) | $Si_{90}Al_{10}N_x$ (33) | $Si_{90}Al_{10}N_x$ (25) |
| | $ZnSnO_x$ (3) | $ZnSnO_x$ (3) | $ZnSnO_x$ (5) |
| | $TiO_x$ (2.5) | $TiO_x$ (2.5) | $Si_{90}Al_{10}N_x$ (3) |
| | ZnO:Al (5) | ZnO:Al (5) | ZnO:Al (5) |
| | Ag (9) | Ag (9) | Ag (10.5) |
| | ZnO:Al (2) | ZnO:Al (2) | ZnO:Al (2) |
| | | | $TiO_x$ (2) |
| | | | ZnO:Al (4) |
| | $ZnSnO_x$ (2) | | |
| | AlN (25) | AlN (25) | |
| | $ZnSnO_x$ (8) | $ZnSnO_x$ (8) | $ZnSnO_x$ (16) |
| | | | $Si_{90}Al_{10}N_x$ (20) |
| Haze score | 0-1 | 2-3 | 0-1 |
| Pass/Fail | Pass | Pass | Pass |
| $\Delta T_L$ | 1.5 | 2.0 | 1.8 |
| Rf $\Delta E^*$ | 1.8 | 2.9 | 1.9 |

The methodology used to collect the data in Table 1 is set out below. The layers were deposited onto a glass pane in sequence starting with the layer at the top of each column.

Heat Treatability Tests

Immediately after the deposition of the coatings of Examples 1-9 the coating stack parameters (haze, $T_L$, and Rf E*) of the coated glass panes were measured. The samples were then heat treated at about 650° C. for about 5 minutes. Thereafter haze, $T_L$ and Rf E* were again measured and $\Delta T_L$ and Rf $\Delta E^*$ calculated therefrom. The results are listed in Table 1 above.

The values stated for the change in % light transmittance upon heat treatment $\Delta T_L$ of the coated glass panes in the Examples 1-9 were derived from measurements according to EN 140.

The colour characteristics were measured and reported using the well established CIE LAB L*, a*, b* coordinates (see e.g. [0030] and [0031] in WO 2004-063 111 A1). The change in film side reflection colour upon heat treatment, Rf $\Delta E^* = ((\Delta a^*)^2 + (\Delta b^*)^2 + (\Delta L^*)^2)^{1/2}$, wherein $\Delta L^*$, $\Delta a^*$ and $\Delta b^*$ are the differences of the colour values L*, a*, b* of the coated glass pane each before and after a heat treatment. $\Delta E^*$ values of less than or equal to 3, preferably at most 2, represent a low and practically non-noticeable colour modification caused by the heat treatment.

A subjective visible haze scoring system was applied to the Examples. The quality assessment system described hereinafter was found to be needed to distinguish better the visual quality of coatings under bright light conditions, properties that are not fully reflected by standard haze values measured in accordance with ASTM D 1003-61.

The evaluation system considers the more macroscopic effect of visible faults in the coating which cause local colour variations where the coating is damaged or imperfect (haze score in Table 1). Macroscopic effects of visible faults in the coating after a heat treatment (all examples exhibit no haze before a heat treatment) were assessed subjectively by viewing samples under bright light. The evaluation is based upon a perfectness scoring (rating) system using scores between 0 (perfect, no faults) through to 3 (high number of clearly visible faults and/or spots) up to 5 (dense haze, often already visible to the naked eye), rating the visual appearance of the coated glass samples after a heat treatment.

The visual evaluation was carried out by using a 2.5 million candle power beam (torch) that is directed at incidence angles between about −90° to about +90° (relative to normal incidence) in two orthogonal planes (i.e. turning the torch first in a horizontal plane and then in a vertical plane) onto a coated glass pane that is arranged in front of a black box. The black box has a sufficiently large size such that several coated glass samples can be evaluated at the same time. The coated glass panes are observed and their visual quality was assessed by varying the angle of incidence as described above, by directing the light beam from the observer through the coated glass panes. The coated glass panes were arranged in front of the black box such that their coating faced the observer. Heat treated coated glass panes with any score ≥3 are considered as having failed the test.

Comparative Example 1 is a "reference" stack with a NiCrO$_x$ barrier layer. Example 1 exhibits some haze (score 0-1) but the level is acceptable. On the other hand, the value for $\Delta T_L$ of 4.7% is too large to fall within the definition of a single stock coated glass pane.

Comparative Example 2 has the same arrangement as Example 1 but omits the NiCrO$_x$ layer, which results in an unacceptable haze score of 4. Furthermore, the value for $\Delta T_L$ of 1.6% is again too large to fall within the definition of a single stock coated glass pane.

Comparative Example 3 has a similar arrangement to Example 2 but with an additional barrier layer (TiO$_x$). This additional barrier layer gives no improvement in haze levels (score of 5).

Comparative Example 4 is similar to Example 3 but inserts a TiO$_x$ layer after the Si$_{90}$Al$_{10}$N$_x$ layer in the lower anti-reflection layer and reverses the order of the barrier layers. This arrangement shows no improvement in haze levels (score of 5) and also exhibits a large $\Delta T_L$ of 2.6% which is outside the definition of a single stock coated glass pane.

Example 5 is similar to Comparative Example 2 but with the addition of a thin separation layer of TiO$_x$ which results in an excellent haze score of 0. Additionally, the values for $\Delta T_L$ and Rf $\Delta E^*$ are good enough to fall within the definition of a single stock coated glass pane.

Example 6 is similar to Example 5 but inserts a further partial barrier layer (TiO$_x$). The haze score of 0 and the values for $\Delta T_L$ and Rf $\Delta E^*$ which conform to the definition of a single stock coated glass pane show that the use of a separation layer provides excellent results independent of the nature of the barrier layer(s).

Example 7 is also similar to Example 5 but utilises AlN/ZnSnO$_x$ on the top of the stack. The haze score of 0-1 and the values for $\Delta T_L$ and Rf $\Delta E^*$ which conform to the definition of a single stock coated glass pane show that the use of a separation layer provides excellent results independent of the nature of the upper anti-reflection layer.

Example 8 resembles Example 7 but with the ZnSnO$_x$ barrier layer removed. Acceptable haze score and values for $\Delta T_L$ and Rf $\Delta E^*$ which conform to the above-mentioned definition again shows that the separation layer provides excellent results independent of the nature of the barrier layer(s).

Example 9 uses a Si$_{90}$Al$_{10}$N$_x$ separation layer and achieves a haze score of 0-1 and values for $\Delta T_L$ and Rf $\Delta E^*$ which conform to the definition of a single stock coated glass pane. This shows that a number of materials are suitable for the separation layer.

The invention claimed is:

1. A heat treated coated glass pane comprising at least the following sequence of layers:
   a glass substrate;
   a base layer located directly on the glass substrate and based on an (oxi)nitride of silicon and/or an (oxi)nitride of aluminium;
   a lower anti-reflection layer, the lower anti-reflection layer comprising in sequence from the base layer:
      a layer based on an oxide of Zn and Sn said layer being located directly on the base layer based on an (oxi)nitride of silicon and/or an (oxi)nitride of aluminium;
      a separation layer based on Ti oxide or Si oxide; and
      a top layer based on an oxide of Zn; and
   a silver-based functional layer; and
   further comprising a barrier layer located in sequence from the glass substrate over and in contact with the silver based functional layer; and wherein the barrier layer does not comprise a substoichiometric NiCrO$_x$ sacrificial barrier layer; and
   further comprising an upper anti-reflection layer in sequence over the barrier layer; and
   wherein the upper anti-reflection layer comprises:
      a layer based on a metal oxide, and
      a layer based on an (oxi)nitride of aluminium and/or an (oxi)nitride of silicon; and
   wherein the change in percentage light transmittance of the glass pane after heat treatment is less than or equal to 2.

2. The pane according to claim 1, wherein the base layer based on an (oxi)nitride of silicon and/or an (oxi)nitride of aluminium has a thickness of from 20 to 40 nm.

3. The pane according to claim 1, wherein the layer based on an oxide of Zn and Sn of the lower anti-reflection layer has a thickness of from 1 to 8 nm.

4. The pane according to claim 1, wherein the separation layer based on a metal oxide and/or an (oxi)nitride of silicon and/or an (oxi)nitride of aluminium has a thickness of from 0.5 to 5 nm.

5. The pane according to claim 1, wherein the top layer based on an oxide of Zn has a thickness of from 3 to 10 nm.

6. The pane according to claim 1, wherein the silver-based functional layer has a thickness of from 5 to 20 nm.

7. The pane according to claim 1, wherein the top layer based on an oxide of Zn in the lower anti-reflection layer is in direct contact with the silver-based functional layer.

8. The pane according to claim 1, wherein the barrier layer has a thickness of from 1 to 10 nm.

9. The pane according to claim 1, wherein the layer based on a metal oxide in the upper anti-reflection layer has a thickness of from 2 to 20 nm.

10. The pane according to claim 1, wherein the layer based on an (oxi)nitride of aluminium and/or an (oxi)nitride of silicon in the upper anti-reflection layer has a thickness of from 15 to 35 nm.

11. The pane according to claim 1, wherein the pane comprises more than one silver-based functional layer.

12. The pane according to claim 11, wherein each silver-based functional layer is spaced apart from an adjacent silver-based functional layer by an intervening central anti-reflection layer.

13. A multiple glazing comprising a pane in accordance with claim 1.

14. A heat treated coated glass pane comprising at least the following sequence of layers:
   a glass substrate;
   a base layer located directly on the glass substrate and based on an (oxi)nitride of silicon and/or an (oxi)nitride of aluminium;
   a lower anti-reflection layer, the lower anti-reflection layer comprising in sequence from the base layer:
      a layer based on an oxide of Zn and Sn, said layer located directly on the base layer based on an (oxi)nitride of silicon and/or an (oxi)nitride of aluminium;
      a separation layer based on Ti oxide or Si oxide; and
      a top layer based on an oxide of Zn; and a single silver-based functional layer; and further comprising a barrier layer located in sequence from the glass substrate over and in contact with the silver based functional layer; and wherein the barrier layer does not comprise a substoichiometric $NiCrO_x$ sacrificial barrier layer; and further comprising an upper anti-reflection layer in sequence over the barrier layer; and wherein the upper anti-reflection layer comprises a layer based on a metal oxide, and a layer based on an (oxi)nitride of aluminium and/or an (oxi)nitride of silicon; and wherein the change in percentage light transmittance of the glass pane after heat treatment is less than or equal to 2%.

15. A method of manufacturing a heat treated coated glass pane in accordance with claim 1 comprising providing a glass substrate and successively applying to said glass substrate:

a base layer based on an (oxi)nitride of silicon and/or an (oxi)nitride of aluminium applied directly to the glass substrate, a layer based on an oxide of Zn and Sn located directly on the base layer based on an (oxi)nitride of silicon and/or an oxinitride of aluminium, a separation layer based on Ti oxide or Si oxide by sputtering from a Ti metal oxide target or a Si metal oxide target or depositing a Ti or Si metal layer that is subsequently oxidised, a top layer based on an oxide of Zn, a silver-based functional layer, a barrier layer, and an upper anti-reflection layer, wherein any portion of the barrier layer that is in direct contact with the silver-based functional layer is deposited by sputtering in an atmosphere with no or up to 5% vol. oxygen, and wherein the barrier layer does not comprise a substoichiometric $NiCrO_x$ sacrificial barrier layer; and wherein the change in percentage light transmittance of the glass pane after heat treatment is less than or equal to 2%.

* * * * *